US012806474B2

(12) United States Patent
Gao et al.

(10) Patent No.: US 12,806,474 B2
(45) Date of Patent: Nov. 24, 2026

(54) METHOD FOR CONTROLLING MOTOR, CONTROLLER, FITNESS BIKE AND STORAGE MEDIUM

(71) Applicant: Shenzhen Speediance Living Technology Co., Ltd., Shenzhen (CN)

(72) Inventors: Shifan Gao, Shenzhen (CN); Qilong Wang, Shenzhen (CN); Dianhai Li, Shenzhen (CN)

(73) Assignee: Shenzhen Speediance Living Technology Co., Ltd., Shenzhen (CN)

( * ) Notice: Subject to any disclaimer, the term of this patent is extended or adjusted under 35 U.S.C. 154(b) by 211 days.

(21) Appl. No.: 18/924,409

(22) Filed: Oct. 23, 2024

(65) Prior Publication Data

US 2025/0352854 A1 Nov. 20, 2025

(30) Foreign Application Priority Data

May 20, 2024 (CN) ......................... 202410625818.6

(51) Int. Cl.

| | |
|---|---|
| ***A63B 22/06*** | (2006.01) |
| ***A63B 21/005*** | (2006.01) |
| ***A63B 24/00*** | (2006.01) |
| ***H02P 21/18*** | (2016.01) |
| ***H02P 21/22*** | (2016.01) |

(52) U.S. Cl.
CPC ...... *A63B 24/0062* (2013.01); *A63B 21/0058* (2013.01); *A63B 22/0605* (2013.01); *H02P 21/18* (2016.02); *H02P 21/22* (2016.02); *A63B 2024/0093* (2013.01); *A63B 2220/18* (2013.01); *A63B 2220/30* (2013.01); *A63B 2220/52* (2013.01); *A63B 2220/54* (2013.01)

(58) Field of Classification Search
CPC ............ A63B 22/0605; A63B 24/0062; A63B 21/0058; A63B 2024/0093; A63B 2220/18; H02P 21/18; H02P 21/22
See application file for complete search history.

(56) References Cited

U.S. PATENT DOCUMENTS

2018/0085615 A1* 3/2018 Astolfi ............... A63B 22/0605

FOREIGN PATENT DOCUMENTS

WO WO-2021004476 A1 * 2/2021 ......... A63B 22/0605

* cited by examiner

*Primary Examiner* — Cortez M Cook
(74) *Attorney, Agent, or Firm* — Morse, Barnes-Brown & Pendleton, P.C.; Sean D. Detweiler, Esq.

(57) ABSTRACT

Provided are a method for controlling a motor, a controller, a fitness bike and a storage medium. The method includes: acquiring a vehicle parameter of a fitness bike and an operating parameter of the fitness bike in a present control cycle; determining first power applied to the fitness bike by a user according to the present torque current, the torque coefficient and the present rotational speed; determining second power applied to the fitness bike by the overall resistance according to the overall resistance, the wheel radius and the present rotational speed; and determining a given rotational speed of the motor in the next control cycle according to the total weight, the wheel radius, the first power and the second power, and controlling the motor to operate according to the given rotational speed in the next control cycle.

20 Claims, 4 Drawing Sheets

METHOD FOR CONTROLLING MOTOR, CONTROLLER, FITNESS BIKE AND STORAGE MEDIUM

CROSS-REFERENCE TO RELATED APPLICATION(S)

This application claims priority to Chinese Patent Application No. 202410625818.6 filed with the China National Intellectual Property Administration (CNIPA) on May 20, 2024, the disclosure of which is incorporated herein by reference in its entirety.

TECHNICAL FIELD

The present disclosure relates to the technical field of fitness equipment and, in particular, a method for controlling a motor, a controller, a fitness bike, and a storage medium.

BACKGROUND

As efficient and safe indoor fitness equipment, a fitness bike (also referred to as a spin bike) has become a healthy life choice for more and more people.

In an existing fitness bike, the rotation of a wheel is generally simulated by the rotation of a flywheel, and the resistance can only be adjusted by adjusting a reluctance torque in this type of fitness bike. However, the existing fitness bikes cannot implement a user requirement to simulate various outdoor riding scenarios, such as a slope climbing riding scenario and a reverse wind riding scenario.

SUMMARY

The present disclosure provides a method for controlling a motor, a controller, a fitness bike, and a storage medium so that the motor can be accurately controlled and the fitness bike can simulate various riding scenarios.

According to an aspect of the present disclosure, a method for controlling a motor is provided and is applied to a fitness bike where the motor is disposed/located. The method includes the steps described below.

A vehicle parameter of the fitness bike and an operating parameter of the fitness bike in a present control cycle are acquired, where the vehicle parameter includes a total weight of the fitness bike, a wheel radius of the fitness bike, and a torque coefficient of the motor, and the operating parameter includes a present torque current of the motor, a present rotational speed of the motor and an overall resistance experienced by the fitness bike.

First power applied to the fitness bike by a user is determined according to the present torque current, the torque coefficient, and the present rotational speed.

Second power applied to the fitness bike by the overall resistance is determined according to the overall resistance, the wheel radius, and the present rotational speed.

A given rotational speed of the motor in a next control cycle is determined according to the total weight, the wheel radius, the first power, and the second power, and the motor is controlled to operate according to the given rotational speed in the next control cycle.

In one or more embodiments, the overall resistance includes at least one of an external resistance experienced by the fitness bike, a constant resistance set by the user, or a slope resistance generated when the fitness bike simulates slope riding.

The slope resistance is determined based on a riding slope and the total weight.

In one or more embodiments, the step of determining the first power applied to the fitness bike by the user according to the present torque current, the torque coefficient, and the present rotational speed include the steps described below.

A present output torque of the motor is determined according to the present torque current and the torque coefficient.

The first power is determined according to the present output torque and the present rotational speed.

In one or more embodiments, the step of determining the second power applied to the fitness bike by the overall resistance according to the overall resistance, the wheel radius, and the present rotational speed includes the steps described below.

A present speed of the fitness bike is determined according to the wheel radius and the present rotational speed.

The second power is determined according to the overall resistance and the present speed.

In one or more embodiments, the step of determining the given rotational speed of the motor in the next control cycle according to the total weight, the wheel radius, the first power and the second power includes the steps described below.

Energy of the fitness bike in the present control cycle is determined according to the first power and the second power.

An ideal speed of the fitness bike is determined according to the total weight and the energy.

The given rotational speed is determined according to the ideal speed and the wheel radius.

In one or more embodiments, the step of acquiring the present torque current and the present rotational speed includes the steps described below.

Three-phase currents of the motor in a three-phase stationary coordinate system are acquired in the present control cycle.

Clarke transform is performed on the three-phase currents to obtain two-phase currents of the motor in a two-phase stationary coordinate system.

The present rotational speed and a position of a rotor of the motor are determined according to the two-phase currents and given two-phase voltages of the present control cycle.

Park transform is performed on the position of the rotor of the motor and the two-phase currents to obtain the present torque current.

In one or more embodiments, a three-phase bridge connected to the motor is further disposed in the fitness bike.

The step of controlling the motor to operate according to the given rotational speed in the next control cycle includes the steps described below.

In the next control cycle, a given torque current of the motor is determined according to the given rotational speed and the present rotational speed, and a first voltage is determined according to the given torque current and the present torque current.

A second voltage is determined according to a given exciting current and a present exciting current of the motor, where the present exciting current is obtained after the Park transform is performed on the position of the rotor of the motor and the two-phase currents.

Inverse Park transform is performed on the position of the rotor of the motor, the first voltage, and the second voltage, to obtain the given two-phase voltages of the motor in the next control cycle.

The given two-phase voltages of the next control cycle are processed by utilizing a space vector pulse-width modulation (SVPWM) module to obtain a switch signal, and the switch signal is input to the three-phase bridge to control the three-phase bridge to drive the motor to operate according to the given rotational speed.

According to another aspect of the present disclosure, a controller is provided. The controller includes at least one processor and a memory communicatively connected to the at least one processor.

The memory stores a computer program executable by the at least one processor, and the computer program is executed by the at least one processor to cause the at least one processor to perform the method for controlling a motor according to any embodiment of the present disclosure.

According to another aspect of the present disclosure, a fitness bike is provided. The fitness bike includes the controller according to any embodiment of the present disclosure, a motor, and a three-phase bridge, and the motor is connected to the three-phase bridge.

According to another aspect of the present disclosure, a computer-readable storage medium storing a computer instruction is provided, and when the computer instruction is executed by a processor, the method for controlling a motor according to any embodiment of the present disclosure is performed.

In the technical solution of the embodiment of the present disclosure, the vehicle parameter of the fitness bike and the operating parameter of the fitness bike in the present control cycle are acquired so that the first power applied to the fitness bike by the user and the second power applied to the fitness bike by the overall resistance are determined, the given rotational speed of the motor in the next control cycle is determined according to the total weight, the wheel radius, the first power and the second power, and the motor is controlled to operate according to the given rotational speed in the next control cycle. In a first aspect, since the operating parameter includes the overall resistance experienced by the fitness bike and different overall resistances can describe different riding scenarios of the fitness bike, various riding scenarios are simulated by the fitness bike. In a second aspect, the motor is controlled according to a control cycle, the duration of the control cycle may be determined according to an actual requirement or a hardware condition of the controller. When the control cycle is relatively short, the fitness bike can be controlled smoothly, and when the control cycle is relatively long, requirements on the fitness bike for computing power can be reduced. In a third aspect, the given rotational speed of the motor in the next control cycle is determined based on the total weight, the wheel radius, the first power and the second power by following the law of conservation of energy, avoiding a waste of energy and accurately controlling the motor. In addition, when the given rotational speed of the motor in the next control cycle is determined according to this solution, various riding data of the fitness bike can be obtained, facilitating the query of the user.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions of embodiments of the present disclosure more clearly, drawings used in the description of embodiments of the present disclosure are described hereinafter. These drawings show illustrative embodiments of the present disclosure. Those of ordinary skill in the art may obtain other drawings based on these drawings on the premise that no creative work is done.

DETAILED DESCRIPTION

For a better understanding of the solutions of the present disclosure by those skilled in the art, the technical solutions in embodiments of the present disclosure are described clearly and completely below in conjunction with the drawings in embodiments of the present disclosure. The embodiments described below are merely illustrative embodiments of the present disclosure. Based on embodiments of the present disclosure, all other embodiments obtained by those of ordinary skill in the art on the premise that no creative work is done are within the scope of the present disclosure.

It is to be noted that the terms "first", "second", "present", "given" and the like in the description, claims, and above drawings of the present disclosure are used to distinguish between similar objects and are not necessarily used to describe a particular order or sequence. It is to be understood that the data used in this manner is interchangeable in appropriate cases so that embodiments of the present disclosure described herein may also be implemented in a sequence not illustrated or described herein. Additionally, the terms "including" and "having" as well as any variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product or device.

Embodiment One

Figure 1:
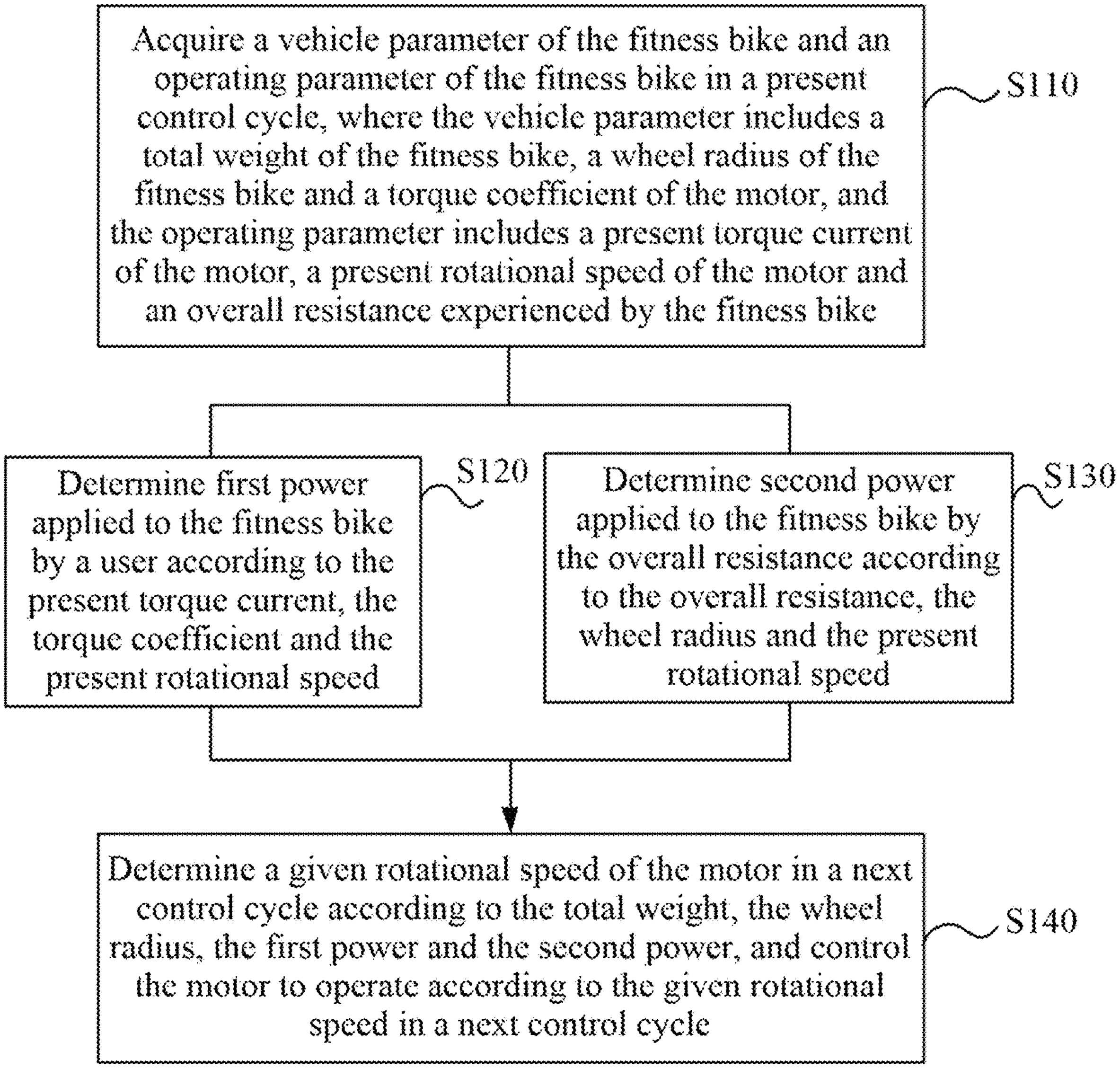
FIG. 1 is a flowchart of a method for controlling a motor according to embodiment one of the present disclosure.

FIG. 1 is a flowchart of a method for controlling a motor according to embodiment one of the present disclosure. The present embodiment may be applied to the case where a user controls the motor of a fitness bike when using the fitness bike. The method may be performed by a controller. The controller may be implemented in the form of hardware and/or software. The controller may be configured in the fitness bike, and the motor is disposed/located in the fitness bike. As shown in FIG. 1, the method includes S110, S120, S130 and S140.

In S110, a vehicle parameter of the fitness bike and an operating parameter of the fitness bike in a present control cycle are acquired, where the vehicle parameter includes a total weight of the fitness bike, a wheel radius of the fitness bike and a torque coefficient of the motor, and the operating parameter includes a present torque current of the motor, a present rotational speed of the motor and an overall resistance experienced by the fitness bike.

In the present disclosure, the fitness bike may be a stationary bike used indoors, or may be a bike with a fitness function used outdoors. The fitness bike includes at least the controller and the motor. The motor has the drive function and power generation function. The controller is used for controlling the motor. In one or more embodiments, the fitness bike may further include a display screen for displaying various riding data (for example, power consumption and the present speed) of the fitness bike. When the display screen includes the touch function, the user may perform various operations on the fitness bike by using the display screen, for example, setting a constant resistance and querying the riding data.

The method for controlling a motor provided in the present disclosure may be performed when the user starts to use the fitness bike, or may be performed during use. The controller controls the motor according to a control cycle. The duration of the control cycle may be determined according to an actual requirement or a hardware condition of the controller. For example, the duration of the control cycle is 1 ms, 10 ms, 50 ms, 100 ms, 500 ms, 1 s, 3 s, 5 s, or the like. For example, assuming that the hardware condition of the controller is good (for example, the operation speed is fast), the control cycle may be set to shorter; or assuming that the user has a high requirement for the riding experience of the fitness bike, the control cycle may also be set to shorter.

The present control cycle is the control cycle corresponding to the time when the method for controlling a motor is executed, and the next control cycle is the next control cycle relative to the present control cycle. Therefore, the present control cycle and the next control cycle are relative concepts in terms of time.

In an embodiment, the vehicle parameter of the fitness bike includes the total weight of the fitness bike, the wheel radius of the fitness bike, and the torque coefficient of the motor. The total weight includes a self-weight and a load of the fitness bike (including but not limited to a counterweight of the bike and a body weight of the user). The torque coefficient of the motor refers to the magnitude of a torque generated at the unit current and is one of the key parameters of the performance of the motor, reflecting a torque output capability of the motor in a working state. Generally, the higher the torque coefficient of the motor, the greater the torque output by the motor at the same current, the higher the working efficiency.

The vehicle parameter is generally not changed during one use of the user. The wheel radius of the fitness bike and the torque coefficient of the motor may be pre-stored in the controller and directly read by the controller. The total weight of the fitness bike may be obtained by measuring the load of the fitness bike plus the pre-stored self-weight of the fitness bike.

In an embodiment, the operating parameter of the fitness bike in the present control cycle includes the present torque current of the motor, the present rotational speed of the motor and the overall resistance experienced by the fitness bike.

The overall resistance experienced by the fitness bike may include at least one of an external resistance experienced by the fitness bike, a constant resistance set by the user, or a slope resistance generated when the fitness bike simulates slope riding. The external resistance experienced by the fitness bike includes, but is not limited to, a wind resistance, and a frictional resistance of a wheel.

When the overall resistance includes the external resistance, the controller may measure the magnitude of the external resistance through a device such as a sensor; when the overall resistance includes the constant resistance set by the user, the controller may directly read the magnitude of the constant resistance; and when the overall resistance includes the slope resistance generated when the fitness bike simulates the slope riding, a riding slope of the slope riding simulation may be preset or set by the user. The determined riding slope enables the slope resistance to be calculated according to the following formula: $F_3=mg\sin\theta$, where $F_3$ is the slope resistance, m is the total weight, g is a gravity coefficient, and $\theta$ is the riding slope.

Since the resistances included in the overall resistance may not change in terms of type and may change in terms of magnitude, different overall resistances can describe different riding scenarios of the fitness bike. In particular, when the overall resistance includes the slope resistance, a slope riding scenario can be simulated by the fitness bike so that multiple riding scenarios are provided for the user to select, thereby improving the experience of the user.

The present torque current and the present rotational speed of the motor may be directly read by a measurement device, or may be calculated through an algorithm, which is not limited in the present embodiment.

In S120, first power applied to the fitness bike by a user is determined according to the present torque current, the torque coefficient, and the present rotational speed.

According to the law of conservation of energy, energy can neither be created nor destroyed; rather, it can only be transformed from one form to another or transferred from one object to another, and the total amount of energy remains unchanged. That is, for the fitness bike, a change in the total energy can only be equal to the amount of energy transferred to or out of the fitness bike. Therefore, in the present disclosure, to control the motor, work done by the user on the fitness bike and work done by the overall resistance on the fitness bike need to be considered. The work done by the user on the fitness bike can be determined according to the present torque current, the torque coefficient, and the present rotational speed. For example, the controller may determine a present output torque of the motor according to the present torque current and the torque coefficient and then determine the first power according to the present output torque and the present rotational speed.

In S130, second power applied to the fitness bike by the overall resistance is determined according to the overall resistance, the wheel radius, and the present rotational speed.

The work done by the overall resistance on the fitness bike can be determined according to the overall resistance, the wheel radius, and the present rotational speed. For example, the controller may determine a present speed of the fitness bike according to the wheel radius and the present rotational speed and then determine the second power according to the overall resistance and the present speed.

It is to be noted that there is no execution order between steps S120 and S130 in the present embodiment. That is, step S120 may be performed before step S130 is performed, step S130 may be performed before step S120 is performed, or steps S120 and 130 may be performed simultaneously.

In S140, a given rotational speed of the motor in the next control cycle is determined according to the total weight, the wheel radius, the first power, and the second power, and the motor is controlled to operate according to the given rotational speed in the next control cycle.

Since the first power applied to the fitness bike by the user is determined in step S120 and the second power applied to the fitness bike by the overall resistance is determined in step S130, the controller may determine the energy of the fitness bike in the present control cycle according to the first power and the second power and further determine the given rotational speed of the motor in the next control cycle according to the energy, the total weight and the wheel radius so that the motor is controlled to operate according to the given rotational speed in the next control cycle.

In this manner, the law of conservation of energy is followed so that the given rotational speed of the motor in the next control cycle is determined, thereby avoiding a waste of energy and accurately controlling the motor.

Embodiment Two

Figure 2:
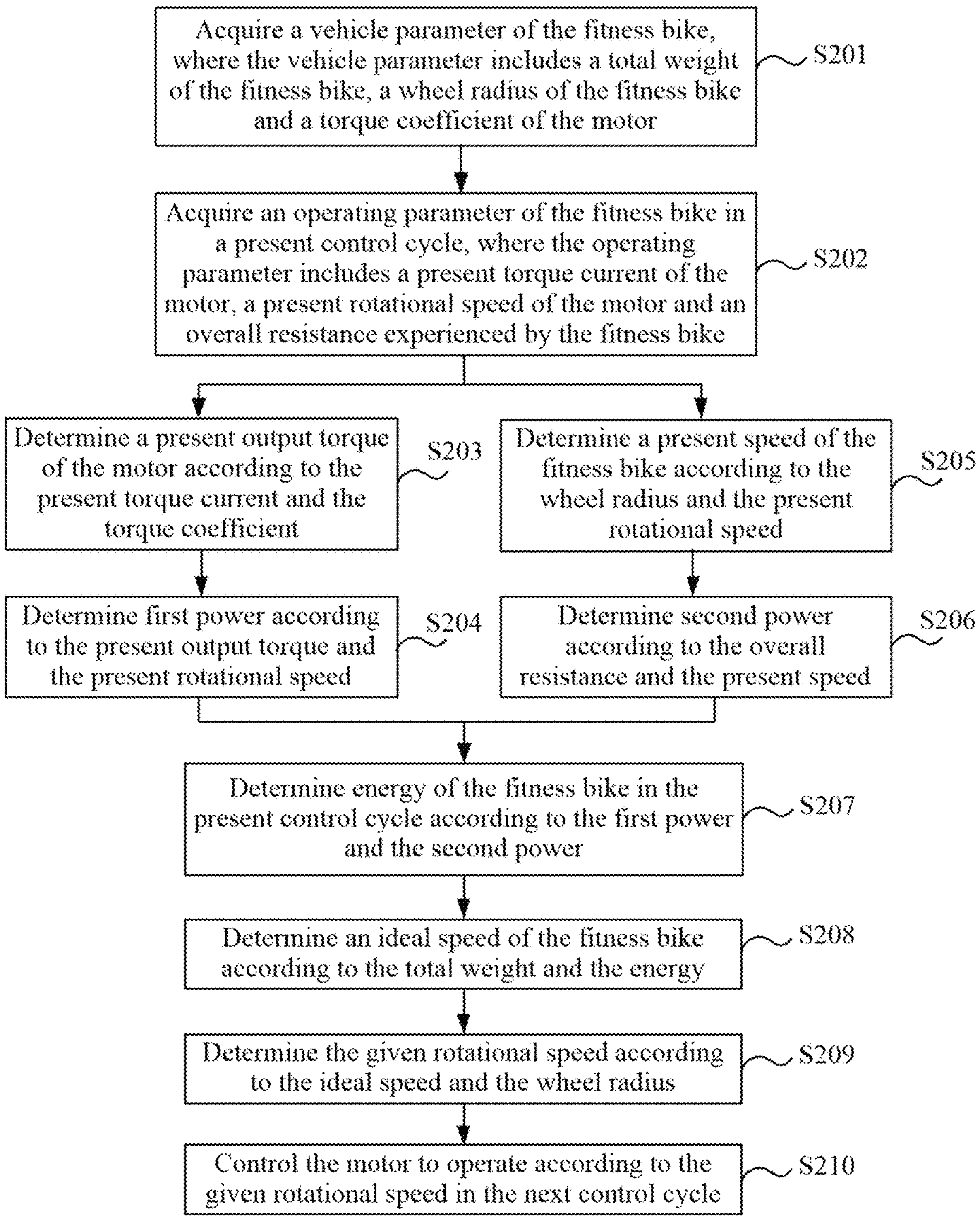
FIG. 2 is a flowchart of a method for controlling a motor according to embodiment two of the present disclosure.

FIG. 2 is a flowchart of a method for controlling a motor according to embodiment two of the present disclosure. On the basis of the preceding embodiment one, the present embodiment provides an implementation for controlling the motor. As shown in FIG. 2, the method includes the following.

In S201, a vehicle parameter of the fitness bike is acquired, where the vehicle parameter includes a total weight of the fitness bike, a wheel radius of the fitness bike, and a torque coefficient of the motor.

In the present embodiment, the fitness bike includes a controller, a motor and a three-phase bridge. The motor has the drive function and power generation function. The three-phase bridge (for example, a three-phase inverter bridge) is connected to the motor. The controller is used for controlling the three-phase bridge so that the three-phase bridge drives the motor to work. Optionally, the fitness bike may further include a display screen for displaying various riding data (for example, power consumption and a present speed) of the fitness bike. When the display screen includes the touch function, a user can perform various operations on the fitness bike by using the display screen, for example, setting a constant resistance, setting a riding slope, and querying the riding data.

The total weight of the fitness bike includes a self-weight and a load of the fitness bike (including but not limited to a counterweight of the bike and a body weight of the user). The torque coefficient of the motor refers to the magnitude of a torque generated at the unit current and is one of the key parameters of the performance of the motor, reflecting the torque output capability of the motor in a working state.

The vehicle parameter is generally not changed during one use of the user. The wheel radius of the fitness bike and the torque coefficient of the motor can be pre-stored in the controller and directly read by the controller. The load of the fitness bike is measured plus the pre-stored self-weight of the fitness bike to obtain the total weight of the fitness bike.

In S202, an operating parameter of the fitness bike in a present control cycle is acquired, where the operating parameter includes a present torque current of the motor, a present rotational speed of the motor, and an overall resistance experienced by the fitness bike.

The controller controls the motor according to a control cycle. The duration of the control cycle may be determined according to an actual requirement or a hardware condition of the controller. For example, the duration of the control cycle is 1 ms, 10 ms, 50 ms, 100 ms, 500 ms, 1 s, 3 s, 5 s, or the like. When the hardware condition of the controller is relatively good (for example, the operation speed is relatively fast) or the user has a relatively high requirement for the riding experience of the fitness bike, the control cycle may be set to shorter. In this manner, the fitness bike can be controlled smoothly. On the contrary, when the control cycle is longer, a requirement for the hardware condition of the controller is correspondingly reduced, thereby saving a production cost.

The present control cycle and the next control cycle are relative concepts in terms of time. For example, assuming that the duration of the control cycle is 1 s, the present moment is 12:00:00, the user starts to ride the fitness bike from the present moment, the motor of the fitness bike starts to work and the controller starts to perform the method for controlling a motor provided in the present disclosure, 12:00:00 to 12:00:01 is the present control cycle, and 12:00:01 to 12:00:02 is the next control cycle. When the time reaches 12:00:01, 12:00:01 to 12:00:02 becomes the present control cycle, and 12:00:02 to 12:00:03 is the next control cycle, and so on.

In an embodiment, the overall resistance experienced by the fitness bike may include at least one of an external resistance experienced by the fitness bike, a constant resistance set by the user, or a slope resistance generated when the fitness bike simulates the slope riding. The external resistance experienced by the fitness bike includes, but is not limited to, a wind resistance and a frictional resistance of a wheel.

When the overall resistance includes the external resistance $F_1$, the controller may measure the magnitude of the external resistance through a device such as a sensor; when the overall resistance includes the constant resistance $F_2$ set by the user, the controller may directly read the magnitude of the constant resistance; and when the overall resistance includes the slope resistance $F_3$ generated when the fitness bike simulates the slope riding, a riding slope of the slope riding simulation may be preset or set by the user. The slope resistance is calculated according to the following formula through the determined riding slope: $F_3=mg\sin\theta$, where m is the total weight, g is the gravity coefficient, and θ is the riding slope. That is, the overall resistance F is equal to $F_1+F_2+F_3$. When the value of $F_1$ is 0, it indicates that the overall resistance does not include the external resistance. When the value of $F_2$ is 0, it indicates that the overall resistance does not include the constant resistance. When the value of $F_3$ is 0, it indicates that the overall resistance does not include the slope resistance.

Since the resistances included in the overall resistance may not change in terms of type and may change in terms of magnitude, different overall resistances can describe different riding scenarios of the fitness bike. In particular, when the overall resistance includes the slope resistance, a slope riding scenario can be simulated by the fitness bike so that multiple riding scenarios are provided for the user to select, improving the experience of the user.

Figure 3:
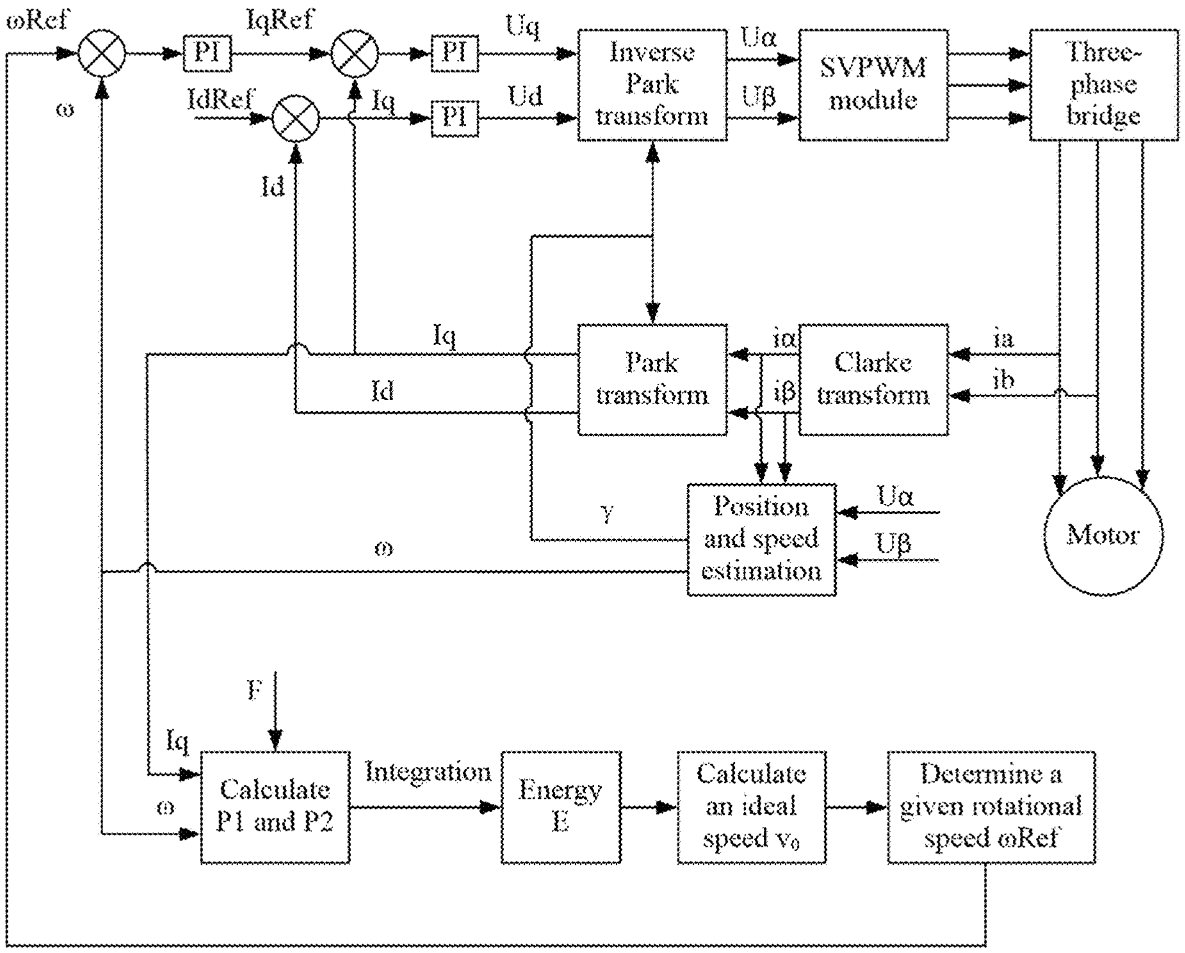
FIG. 3 is a control logic diagram of a motor according to embodiment two of the present disclosure.

In an embodiment, FIG. 3 is a control logic diagram of a motor according to embodiment two of the present disclosure. In conjunction with FIG. 3, the present torque current and the present rotational speed of the motor may be acquired through the four steps described below.

In step A1, three-phase currents of the motor in a three-phase stationary coordinate system are acquired in the present control cycle.

Generally, two-phase currents taken from the three-phase currents may be used for determining the third phase current without doubt. Therefore, in FIG. 3, the three-phase currents are denoted as ia and ib.

In step A2, Clarke transform is performed on the three-phase currents to obtain two-phase currents of the motor in a two-phase stationary coordinate system.

In FIG. 3, the two-phase currents are denoted as iα and iβ.

In step A3, the present rotational speed and a position of a rotor of the motor are determined according to the two-phase currents and given two-phase voltages of the present control cycle.

The given two-phase voltages of the present control cycle are determined when the motor is controlled in the present control cycle to operate according to a given rotational speed in the previous control cycle. The given two-phase voltages are voltages in the two-phase stationary coordinate system. In FIG. 3, the given two-phase voltages are denoted as Uα and Uβ.

Position and speed estimation is performed on the two-phase currents iα and iβ and the given two-phase voltages Uα and Uβ of the present control cycle to determine the present rotational speed ω of the motor and the position y of the rotor of the motor.

In step A4, Park transform is performed on the position of the rotor of the motor and the two-phase currents to obtain the present torque current.

In FIG. 3, the present torque current is denoted as $I_q$. In this manner, the present torque current $I_q$ and the present rotational speed ω of the motor can be obtained.

In addition, with continued reference to FIG. 3, when the Park transform is performed on the position of the rotor of the motor and the two-phase currents in step A4, a present exciting current of the motor may be further obtained and is denoted as $I_d$.

In S203, a present output torque of the motor is determined according to the present torque current and the torque coefficient.

For example, assuming that the torque coefficient is denoted as Kt, the present output torque T of the motor is equal to a product of the torque coefficient Kt and the present torque current $I_q$. That is, $T=Kt*I_q$.

In S204, first power is determined according to the present output torque and the present rotational speed.

Since the first power reflects the work done by the user on the fitness bike, the first power P1 is equal to a negative number of a product of the present output torque T and the present rotational speed ω of the motor. That is, P1=−T*ω.

Generally, the unit of the first power is watt (w).

In S205, a present speed of the fitness bike is determined according to the wheel radius and the present rotational speed.

For example, assuming that the wheel radius is R, the present speed v of the fitness bike is equal to $$\frac{2\pi R}{60} * \omega = \frac{\pi R}{30} * \omega.$$

Generally, the unit of the wheel radius is meter (m), and the unit of the present speed is meter/second (m/s).

In S206, second power is determined according to the overall resistance and the present speed.

Since the second power reflects the work done by the overall resistance on the fitness bike, the second power P2 is equal to a product of the overall resistance F and the present speed v. That is, P2=F*v.

Generally, the unit of the overall resistance is newton (N), and the unit of the second power is watt (w).

It is to be noted that there is no execution order between steps S203 to S204 and S205 to S206 in the present embodiment. That is, steps S203 to S204 may be performed before steps S205 to S206 are performed, steps S205 to S206 may be performed before steps S203 to S204 are performed, or steps S203 to S204 and S205 to S206 may be performed simultaneously.

In S207, the energy of the fitness bike in the present control cycle is determined according to the first power and the second power.

According to the law of conservation of energy, the change in the total energy of the fitness bike can only be equal to the amount of energy transferred to or out of the fitness bike. Therefore, in one control cycle of the present disclosure, the work done by the user on the fitness bike, the work done by the overall resistance on the fitness bike and the work done by the motor are balanced. Therefore, the energy of the fitness bike in the present control cycle can be determined according to the first power and the second power.

The energy E of the fitness bike in the present control cycle is as follows: $E=\int(P1+P2)\cdot dt$, where $\int(\ )\cdot dt$ indicates that the total power done by the outside on the fitness bike is integrated in the present control cycle t.

In S208, an ideal speed of the fitness bike is determined according to the total weight and the energy.

Since the energy of the fitness bike is mainly kinetic energy, the ideal speed $v_0$ of the fitness bike can be calculated in conjunction with a kinetic energy formula, that is, $$v_0 = \sqrt{\frac{2E}{m}}.$$

Generally, the unit of the total weight is kilogram (kg), and the unit of the ideal speed $v_0$ is meter/second (m/s).

In S209, a given rotational speed is determined according to the ideal speed and the wheel radius.

The given rotational speed ωRef is equal to $$\frac{60}{2\pi R} * v_0 = \frac{30}{\pi R} * v_0.$$

In S210, the motor is controlled to operate according to the given rotational speed in the next control cycle.

In conjunction with FIG. 3, step S210 of controlling the motor to operate according to the given rotational speed in the next control cycle may be implemented through the four steps described below.

In step B1, in the next control cycle, a given torque current of the motor is determined according to the given rotational speed and the present rotational speed, and a first voltage is determined according to the given torque current and the present torque current.

An operation may be performed on the given rotational speed ωRef and the present rotational speed ω, and then an operation is performed by a linear controller (a proportional-integral (PI) controller) on the operation result to obtain the given torque current $I_q$ Ref of the motor. Further, an operation is performed on the given torque current $I_q$ Ref and the present torque current $I_q$, and an operation is performed by a linear controller (PI controller) on the operation result to obtain the first voltage $U_q$.

In step B2, a second voltage is determined according to a given exciting current and a present exciting current of the motor, where the present exciting current is obtained after the Park transform is performed on the position of the rotor of the motor and the two-phase currents.

An operation may be performed on the given exciting current $I_d$ Ref and the present exciting current $I_d$ of the motor, and then an operation is performed by a linear controller (PI controller) on the operation result to obtain the second voltage $U_d$. Generally, the given exciting current $I_d$ Ref is set to 0.

It is to be noted that the first voltage $U_q$ and the second voltage $U_d$ are voltages in a two-phase rotating coordinate system.

In step B3, inverse Park transform is performed on the position of the rotor of the motor, the first voltage and the second voltage to obtain given two-phase voltages of the motor in the next control cycle.

In step B4, the given two-phase voltages of the next control cycle are processed by a space vector pulse-width modulation (SVPWM) module to obtain a switch signal, and the switch signal is input to the three-phase bridge to control the three-phase bridge to drive the motor to operate according to the given rotational speed.

It is to be noted that the given rotational speed ωRef of the motor is 0 at an initial moment when the user rides the fitness bike. Once the user starts to ride, the motor starts to work as long as a sum of the first power applied to the fitness bike by the user and the second power applied to the fitness bike by the overall resistance is not 0. Of course, if the sum of the first power applied to the fitness bike by the user and the second power applied to the fitness bike by the overall resistance is equal to 0, in this case, work done by the outside on the fitness bike is balanced, and the motor does not work. When the value of the present torque current $I_q$ is negative, it indicates that the motor is in a power generation state. When the value of the present torque current $I_q$ is positive, it indicates that the motor is in a driven state.

In this manner, the law of conservation of energy is followed so that the given rotational speed of the motor in the next control cycle is determined, thereby avoiding a waste of energy and accurately controlling the motor. In addition, when the given rotational speed of the motor in the next control cycle is determined according to this solution, various riding data of the fitness bike can be obtained, facilitating the query of the user.

The embodiment of the present disclosure provides the method for controlling a motor that is applied to the fitness bike where the motor is disposed/located. The method includes the following: acquiring the vehicle parameter of the fitness bike and the operating parameter of the fitness bike in the present control cycle, where the vehicle parameter includes the total weight of the fitness bike, the wheel radius of the fitness bike and the torque coefficient of the motor, and the operating parameter includes the present torque current of the motor, the present rotational speed of the motor and the overall resistance experienced by the fitness bike; determining the first power applied to the fitness bike by the user according to the present torque current, the torque coefficient and the present rotational speed; determining the second power applied to the fitness bike by the overall resistance according to the overall resistance, the wheel radius and the present rotational speed; and determining the given rotational speed of the motor in the next control cycle according to the total weight, the wheel radius, the first power and the second power, and controlling the motor to operate according to the given rotational speed in the next control cycle. In the technical solution of the embodiment of the present disclosure, the vehicle parameter of the fitness bike and the operating parameter of the fitness bike in the present control cycle are acquired so that the first power applied to the fitness bike by the user and the second power applied to the fitness bike by the overall resistance are determined, the given rotational speed of the motor in the next control cycle is determined according to the total weight, the wheel radius, the first power and the second power, and the motor is controlled to operate according to the given rotational speed in the next control cycle. In a first aspect, since the operating parameter includes the overall resistance experienced by the fitness bike and different overall resistances can describe different riding scenarios of the fitness bike, various riding scenarios are simulated by the fitness bike. In a second aspect, the motor is controlled according to the control cycle, and the duration of the control cycle may be determined according to the actual requirement or the hardware condition of the controller. When the control cycle is relatively short, the fitness bike can be controlled smoothly, and when the control cycle is relatively long, requirements on the fitness bike for computing power can be reduced. In a third aspect, the given rotational speed of the motor in the next control cycle is determined based on the total weight, the wheel radius, the first power and the second power by following the law of conservation of energy, avoiding the waste of energy and accurately controlling the motor. In addition, when the given rotational speed of the motor in the next control cycle is determined according to this solution, various riding data of the fitness bike can be obtained, facilitating the query of the user.

Embodiment Three

Figure 4:
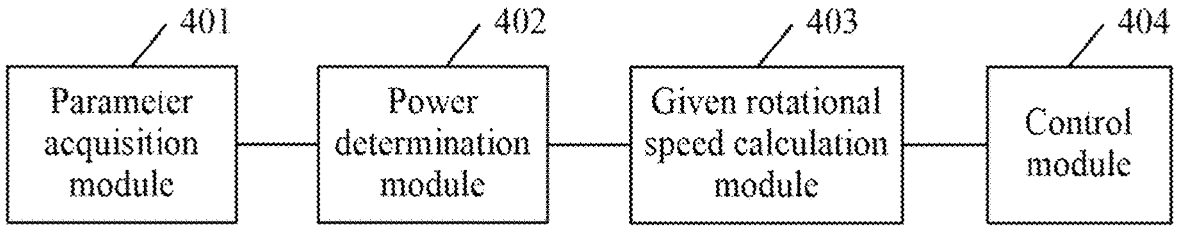
FIG. 4 is a structure diagram of an apparatus for controlling a motor according to embodiment three of the present disclosure.

FIG. 4 is a structure diagram of an apparatus for controlling a motor according to embodiment three of the present disclosure. As shown in FIG. 4, the apparatus includes a parameter acquisition module 401, a power determination module 402, a given rotational speed calculation module 403, and a control module 404.

The parameter acquisition module 401 is configured to acquire a vehicle parameter of a fitness bike and an operating parameter of the fitness bike in a present control cycle, where the vehicle parameter includes a total weight of the fitness bike, a wheel radius of the fitness bike and a torque coefficient of the motor, and the operating parameter includes a present torque current of the motor, a present rotational speed of the motor and an overall resistance experienced by the fitness bike.

The power determination module 402 is configured to determine first power applied to the fitness bike by a user according to the present torque current, the torque coefficient, and the present rotational speed and determine second power applied to the fitness bike by the overall resistance according to the overall resistance, the wheel radius and the present rotational speed.

The given rotational speed calculation module 403 is configured to determine a given rotational speed of the motor in a next control cycle according to the total weight, the wheel radius, the first power, and the second power.

The control module 404 is configured to control the motor to operate according to the given rotational speed in the next control cycle.

In one or more embodiments, the overall resistance includes at least one of an external resistance experienced by the fitness bike, a constant resistance set by the user, or a slope resistance generated when the fitness bike simulates slope riding, where the slope resistance is determined based on a riding slope and the total weight.

In one or more embodiments, the power determination module 402 is configured to determine a present output torque of the motor according to the present torque current and the torque coefficient and determine the first power according to the present output torque and the present rotational speed.

In one or more embodiments, the power determination module 402 is configured to determine a present speed of the fitness bike according to the wheel radius and the present rotational speed and determine the second power according to the overall resistance and the present speed.

In one or more embodiments, the given rotational speed calculation module 403 is configured to determine energy of the fitness cycle in the present control cycle according to the first power and the second power, determine an ideal speed of the fitness bike according to the total weight and the energy and determine the given rotational speed according to the ideal speed and the wheel radius.

In one or more embodiments, the parameter acquisition module 401 is configured to acquire three-phase currents of the motor in a three-phase stationary coordinate system in the present control cycle, perform Clarke transform on the three-phase currents to obtain two-phase currents of the motor in a two-phase stationary coordinate system, determine the present rotational speed and a position of a rotor of the motor according to the two-phase currents and given two-phase voltages of the present control cycle, and perform Park transform on the position of the rotor of the motor and the two-phase currents to obtain the present torque current.

In one or more embodiments, the control module 404 is configured to, in the next control cycle, determine a given torque current of the motor according to the given rotational speed and the present rotational speed, determine a first voltage according to the given torque current and the present torque current, determine a second voltage according to a given exciting current and a present exciting current of the motor, perform inverse Park transform on the position of the rotor of the motor, the first voltage and the second voltage to obtain given two-phase voltages of the motor in the next control cycle, process the given two-phase voltages by using a space vector pulse-width modulation (SVPWM) module to obtain a switch signal and input the switch signal to a three-phase bridge to control the three-phase bridge to drive the motor to operate according to the given rotational speed, where the present exciting current is obtained after the Park transform is performed on the position of the rotor of the motor and the two-phase currents.

The apparatus for controlling a motor provided by the embodiment of the present disclosure may perform the method for controlling a motor provided by any one of the embodiments of the present disclosure and has functional modules and beneficial effects corresponding to the performed method.

Embodiment Four

Figure 5:
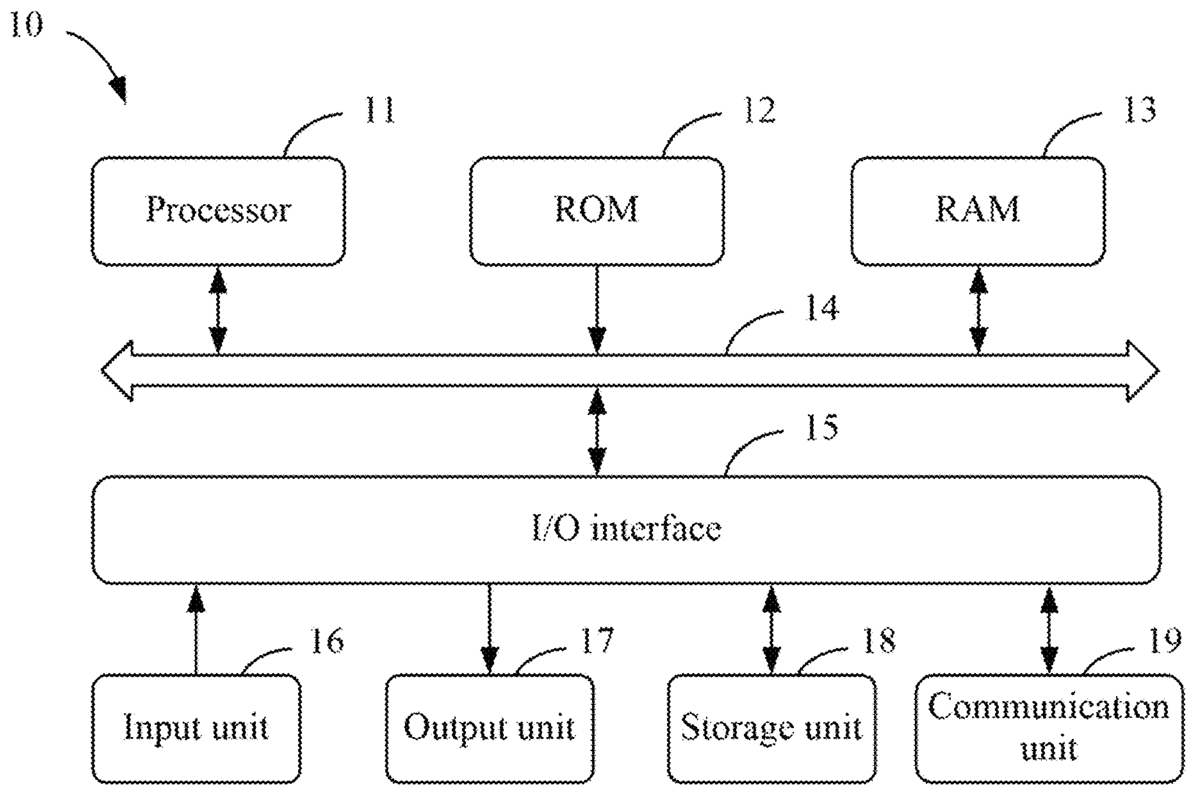
FIG. 5 is a structure diagram of a controller according to embodiment four of the present disclosure.

FIG. 5 is a structure diagram of a controller according to embodiment four of the present disclosure. The controller is intended to represent various forms of digital computers, for example, a laptop computer, a desktop computer, a worktable, a personal digital assistant, a server, a blade server, a mainframe computer or another applicable computer. Herein the shown components, the connections and relationships between these components, and the functions of these components are illustrative only and are not intended to limit the implementation of the present disclosure as described and/or claimed herein.

As shown in FIG. 5, the controller 10 includes at least one processor 11 and a memory (such as a read-only memory (ROM) 12 and a random-access memory (RAM) 13) communicatively connected to the at least one processor 11. The memory stores a computer program executable by the at least one processor, and the processor 11 may perform various types of appropriate operations and processing according to a computer program stored in the ROM 12 or a computer program loaded from a storage unit 18 to the RAM 13. Various programs and data required for the operation of the controller 10 may also be stored in the RAM 13. The processor 11, the ROM 12 and the RAM 13 are connected to each other through a bus 14. An input/output (I/O) interface 15 is also connected to the bus 14.

Multiple components in the controller 10 are connected to the I/O interface 15. The multiple components include an input unit 16 such as an adjustment button or a touch screen of a fitness bike, an output unit 17 such as various types of displays or speakers, the storage unit 18 such as a magnetic disk or an optical disk, and a communication unit 19 such as a network card, a modem or a wireless communication transceiver. The communication unit 19 allows the controller 10 to exchange information/data with other devices over a computer network such as the Internet and/or various telecommunications networks.

The processor 11 may be various general-purpose and/or special-purpose processing components having processing and computing capabilities. Examples of the processor 11 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The processor 11 performs the various methods and processing described above, such as the method for controlling a motor.

Figure 6:
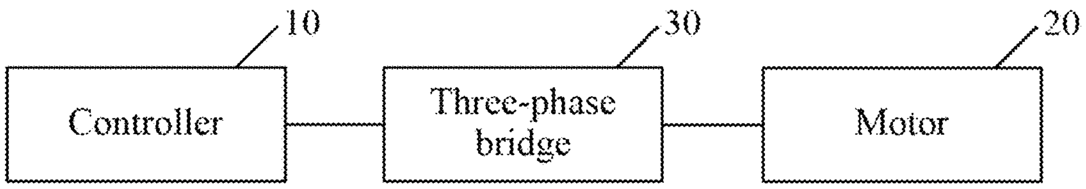
FIG. 6 is a structure diagram of a fitness bike according to embodiment four of the present disclosure.

FIG. 6 is a structure diagram of a fitness bike according to embodiment four of the present disclosure. As shown in FIG. 6, the fitness bike includes the controller 10 described in the preceding embodiment, a motor 20 and a three-phase bridge 30, and the motor 20 is connected to the three-phase bridge 30. The motor 20 has a drive function and a power generation function. The controller 10 is used for controlling the three-phase bridge 30 so that the three-phase bridge 30 drives the motor 20 to work.

In some embodiments, the method for controlling a motor may be implemented as computer programs tangibly contained in a computer-readable storage medium such as the storage unit 18. In some embodiments, part or all of computer programs may be loaded and/or installed on the controller 10 via the ROM 12 and/or the communication unit 19. When the computer programs are loaded to the RAM 13 and executed by the processor 11, one or more steps of the preceding method for controlling a motor may be performed. Alternatively, in other embodiments, the processor 11 may be configured, in any other suitable manner (for example, by means of firmware), to perform the method for controlling a motor.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. These embodiments may include implementations in one or more computer programs. The one or more computer programs may be executable and/or interpretable on a programmable system including at least one programmable processor. A programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Computer programs for implementation of the methods of the present disclosure may be written in one programming language or any combination of multiple programming languages. These computer programs may be provided for a processor of a general-purpose computer, a special-purpose computer or another programmable data processing apparatus such that the computer programs, when executed by the processor, cause functions/operations specified in the flowcharts and/or block diagrams to be implemented. These computer programs may be executed entirely on a machine, partly on a machine, as a stand-alone software package partly on a machine and partly on a remote machine, or entirely on a remote machine or a server.

In the context of the present disclosure, the computer-readable storage medium may be a tangible medium including or storing a computer program that is used by or used in conjunction with an instruction execution system, apparatus or device. The computer-readable storage medium may include, but is not limited to, an electronic, magnetic, optical, electromagnetic, infrared or semiconductor system, apparatus or device, or any suitable combination thereof. Alternatively, the computer-readable storage medium may be a machine-readable signal medium. Concrete examples of the machine-readable storage medium include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device or any suitable combination thereof.

In order that interaction with a user is provided, the systems and techniques described herein may be implemented on a controller. The controller has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the controller. Other types of apparatuses may also be used for providing interaction with a user. For example, feedback provided for the user may be sensory feedback in any form (for example, visual feedback, auditory feedback or tactile feedback); and input from the user may be received in any form (including acoustic input, voice input or tactile input).

The systems and techniques described herein may be implemented in a computing system including a back-end component (for example, a data server), a computing system including a middleware component (for example, an application server), a computing system including a front-end component (for example, a user computer having a graphical user interface or a web browser through which a user can interact with embodiments of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS) service.

An embodiment of the present disclosure further provides a computer program product. The computer program product includes a computer program which, when executed by a processor, implements the method for controlling a motor provided by any embodiment of the present disclosure.

In an implementation process of the computer program product, computer program codes for performing the operations of the present disclosure may be written in one or more programming languages or a combination thereof. The one or more programming languages include object-oriented programming languages such as Java, Smalltalk and C++, as well as conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or connected to an external computer (for example, through the Internet using an Internet service provider).

It is to be understood that various forms of the preceding flows may be used with steps reordered, added or deleted. For example, the steps described in the present disclosure may be performed in parallel, in sequence or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors. Any modification, equivalent substitution, improvement and the like made within the principle of the present disclosure fall within the scope of the present disclosure.

What is claimed is:

1. A method for controlling a motor, applied to a fitness bike where the motor is disposed, comprising:

acquiring a vehicle parameter of the fitness bike and an operating parameter of the fitness bike in a present control cycle, wherein the vehicle parameter comprises a total weight of the fitness bike, a wheel radius of the fitness bike and a torque coefficient of the motor, and the operating parameter comprises a present torque current of the motor, a present rotational speed of the motor and an overall resistance experienced by the fitness bike;

determining first power applied to the fitness bike by a user according to the present torque current, the torque coefficient and the present rotational speed;

determining second power applied to the fitness bike by the overall resistance according to the overall resistance, the wheel radius and the present rotational speed; and determining a given rotational speed of the motor in a next control cycle according to the total weight, the wheel radius, the first power and the second power, and controlling the motor to operate according to the given rotational speed in the next control cycle.

2. The method for controlling the motor according to claim 1, wherein the overall resistance comprises at least one of an external resistance experienced by the fitness bike, a constant resistance set by the user, or a slope resistance generated when the fitness bike simulates slope riding;

wherein the slope resistance is determined based on a riding slope and the total weight.

3. The method for controlling the motor according to claim 1, wherein determining the first power applied to the fitness bike by the user according to the present torque current, the torque coefficient and the present rotational speed comprises:

determining a present output torque of the motor according to the present torque current and the torque coefficient; and determining the first power according to the present output torque and the present rotational speed.

4. The method for controlling the motor according to claim 1, wherein determining the second power applied to the fitness bike by the overall resistance according to the overall resistance, the wheel radius and the present rotational speed comprises:

determining a present speed of the fitness bike according to the wheel radius and the present rotational speed; and determining the second power according to the overall resistance and the present speed.

5. The method for controlling the motor according to claim 1, wherein determining the given rotational speed of the motor in the next control cycle according to the total weight, the wheel radius, the first power and the second power comprises:

determining energy of the fitness bike in the present control cycle according to the first power and the second power;

determining an ideal speed of the fitness bike according to the total weight and the energy; and determining the given rotational speed according to the ideal speed and the wheel radius.

6. The method for controlling the motor according to claim 1, wherein acquiring the present torque current and the present rotational speed comprises:

acquiring three-phase currents of the motor in a three-phase stationary coordinate system in the present control cycle;

performing Clarke transform on the three-phase currents to obtain two-phase currents of the motor in a two-phase stationary coordinate system;

determining the present rotational speed and a position of a rotor of the motor according to given two-phase voltages of the present control cycle and the two-phase currents; and performing Park transform on the position of the rotor of the motor and the two-phase currents to obtain the present torque current.

7. The method for controlling the motor according to claim 6, wherein a three-phase bridge connected to the motor is further disposed in the fitness bike; and controlling the motor to operate according to the given rotational speed in the next control cycle comprises:

in the next control cycle, determining a given torque current of the motor according to the given rotational speed and the present rotational speed, and determining a first voltage according to the given torque current and the present torque current;

determining a second voltage according to a given exciting current and a present exciting current of the motor, wherein the present exciting current is obtained after the Park transform is performed on the position of the rotor of the motor and the two-phase currents;

performing inverse Park transform on the position of the rotor of the motor, the first voltage and the second voltage to obtain given two-phase voltages of the motor in the next control cycle; and processing the given two-phase voltages of the next control cycle through a space vector pulse-width modulation (SVPWM) module to obtain a switch signal, and inputting the switch signal to the three-phase bridge to control the three-phase bridge to drive the motor to operate according to the given rotational speed.

8. A controller, configured in a fitness bike, comprising:

at least one processor and a memory communicatively connected to the at least one processor;

wherein the memory stores a computer program executable by the at least one processor, and the computer program is executed by the at least one processor to cause the at least one processor to perform the following:

acquiring a vehicle parameter of the fitness bike and an operating parameter of the fitness bike in a present control cycle, wherein the vehicle parameter comprises a total weight of the fitness bike, a wheel radius of the fitness bike and a torque coefficient of a motor of the fitness bike, and the operating parameter comprises a present torque current of the motor, a present rotational speed of the motor and an overall resistance experienced by the fitness bike;

determining first power applied to the fitness bike by a user according to the present torque current, the torque coefficient and the present rotational speed;

determining second power applied to the fitness bike by the overall resistance according to the overall resistance, the wheel radius and the present rotational speed; and determining a given rotational speed of the motor in a next control cycle according to the total weight, the wheel radius, the first power and the second power, and controlling the motor to operate according to the given rotational speed in the next control cycle.

9. The controller according to claim 8, wherein the overall resistance comprises at least one of an external resistance experienced by the fitness bike, a constant resistance set by the user, or a slope resistance generated when the fitness bike simulates slope riding;

wherein the slope resistance is determined based on a riding slope and the total weight.

10. The controller according to claim 8, wherein the at least one processor is caused to perform determining the first power applied to the fitness bike by the user according to the present torque current, the torque coefficient and the present rotational speed by:

determining a present output torque of the motor according to the present torque current and the torque coefficient; and determining the first power according to the present output torque and the present rotational speed.

11. The controller according to claim 8, wherein the at least one processor is caused to perform determining the second power applied to the fitness bike by the overall resistance according to the overall resistance, the wheel radius and the present rotational speed by:

determining a present speed of the fitness bike according to the wheel radius and the present rotational speed; and determining the second power according to the overall resistance and the present speed.

12. The controller according to claim 8, wherein the at least one processor is caused to perform determining the given rotational speed of the motor in the next control cycle according to the total weight, the wheel radius, the first power and the second power by:

determining energy of the fitness bike in the present control cycle according to the first power and the second power;

determining an ideal speed of the fitness bike according to the total weight and the energy; and determining the given rotational speed according to the ideal speed and the wheel radius.

13. The controller according to claim 8, wherein the at least one processor is caused to perform acquiring the present torque current and the present rotational speed by:

acquiring three-phase currents of the motor in a three-phase stationary coordinate system in the present control cycle;

performing Clarke transform on the three-phase currents to obtain two-phase currents of the motor in a two-phase stationary coordinate system;

determining the present rotational speed and a position of a rotor of the motor according to given two-phase voltages of the present control cycle and the two-phase currents; and performing Park transform on the position of the rotor of the motor and the two-phase currents to obtain the present torque current.

14. The controller according to claim 13, wherein a three-phase bridge connected to the motor is further disposed in the fitness bike; and the at least one processor is caused to perform controlling the motor to operate according to the given rotational speed in the next control cycle by:

in the next control cycle, determining a given torque current of the motor according to the given rotational speed and the present rotational speed, and determining a first voltage according to the given torque current and the present torque current;

determining a second voltage according to a given exciting current and a present exciting current of the motor, wherein the present exciting current is obtained after the Park transform is performed on the position of the rotor of the motor and the two-phase currents;

performing inverse Park transform on the position of the rotor of the motor, the first voltage and the second voltage to obtain given two-phase voltages of the motor in the next control cycle; and processing the given two-phase voltages of the next control cycle through a space vector pulse-width modulation (SVPWM) module to obtain a switch signal, and inputting the switch signal to the three-phase bridge to control the three-phase bridge to drive the motor to operate according to the given rotational speed.

15. A fitness bike, comprising a controller, a motor and a three-phase bridge, wherein the motor is connected to the three-phase bridge; wherein the controller comprises at least one processor and a memory communicatively connected to the at least one processor; wherein the memory stores a computer program executable by the at least one processor, and the computer program is executed by the at least one processor to cause the at least one processor to perform the following:

acquiring a vehicle parameter of the fitness bike and an operating parameter of the fitness bike in a present control cycle, wherein the vehicle parameter comprises a total weight of the fitness bike, a wheel radius of the fitness bike and a torque coefficient of the motor, and the operating parameter comprises a present torque current of the motor, a present rotational speed of the motor and an overall resistance experienced by the fitness bike;

determining first power applied to the fitness bike by a user according to the present torque current, the torque coefficient and the present rotational speed;

determining second power applied to the fitness bike by the overall resistance according to the overall resistance, the wheel radius and the present rotational speed; and determining a given rotational speed of the motor in a next control cycle according to the total weight, the wheel radius, the first power and the second power, and controlling the motor to operate according to the given rotational speed in the next control cycle.

16. The fitness bike according to claim 15, wherein the overall resistance comprises at least one of an external resistance experienced by the fitness bike, a constant resistance set by the user, or a slope resistance generated when the fitness bike simulates slope riding;

wherein the slope resistance is determined based on a riding slope and the total weight.

17. The fitness bike according to claim 15, wherein the at least one processor is caused to perform determining the first power applied to the fitness bike by the user according to the present torque current, the torque coefficient and the present rotational speed by:

determining a present output torque of the motor according to the present torque current and the torque coefficient; and determining the first power according to the present output torque and the present rotational speed.

18. The fitness bike according to claim 15, wherein the at least one processor is caused to perform determining the second power applied to the fitness bike by the overall resistance according to the overall resistance, the wheel radius and the present rotational speed by:

determining a present speed of the fitness bike according to the wheel radius and the present rotational speed; and determining the second power according to the overall resistance and the present speed.

19. The fitness bike according to claim 15, wherein the at least one processor is caused to perform determining the given rotational speed of the motor in the next control cycle according to the total weight, the wheel radius, the first power and the second power by:

determining energy of the fitness bike in the present control cycle according to the first power and the second power;

determining an ideal speed of the fitness bike according to the total weight and the energy; and determining the given rotational speed according to the ideal speed and the wheel radius.

20. A non-transitory computer-readable storage medium storing a computer instruction, wherein when the computer instruction is executed by a processor, the method for controlling a motor according to claim 1 is performed.

* * * * *